US012476661B2

(12) United States Patent
Jelonnek et al.

(10) Patent No.: US 12,476,661 B2
(45) Date of Patent: Nov. 18, 2025

(54) PARAMETER ESTIMATION FOR LINEARIZATION OF NONLINEAR COMPONENT

(71) Applicant: NOKIA TECHNOLOGIES OY, Espoo (FI)

(72) Inventors: Björn Jelonnek, Ulm (DE); Andre Baumgart, Kraiburg (DE); Michael Weber, Neu Ulm (DE)

(73) Assignee: NOKIA TECHNOLOGIES OY, Espoo (FI)

(*) Notice: Subject to any disclaimer, the term of this patent is extended or adjusted under 35 U.S.C. 154(b) by 463 days.

(21) Appl. No.: 17/917,397

(22) PCT Filed: Apr. 7, 2020

(86) PCT No.: PCT/EP2020/059904
§ 371 (c)(1),
(2) Date: Oct. 6, 2022

(87) PCT Pub. No.: WO2021/204366
PCT Pub. Date: Oct. 14, 2021

(65) Prior Publication Data
US 2023/0155614 A1  May 18, 2023

(51) Int. Cl.
*H04B 1/04* (2006.01)
*H03F 1/32* (2006.01)
*H03F 3/24* (2006.01)

(52) U.S. Cl.
CPC .......... *H04B 1/0475* (2013.01); *H03F 1/32* (2013.01); *H03F 3/245* (2013.01); *H03F 2200/451* (2013.01); *H04B 2001/0433* (2013.01)

(58) Field of Classification Search
CPC .......... H04B 1/0475; H04B 2001/0433; H04B 1/04; H03F 1/32; H03F 3/245;
(Continued)

(56) References Cited

U.S. PATENT DOCUMENTS 7,321,264 B2    1/2008 Kokkeler
2002/0101937 A1 8/2002 Antonio et al.
(Continued)

FOREIGN PATENT DOCUMENTS

CN    101330481 A    12/2008
CN    107251419 A    10/2017
WO    2011/103767 A1  9/2011

OTHER PUBLICATIONS

International Search Report and Written Opinion dated Jan. 13, 2021 corresponding to International Patent Application No. PCT/EP2020/059904.
(Continued)

*Primary Examiner* — Ankur Jain
(74) *Attorney, Agent, or Firm* — SQUIRE PATTON BOGGS (US) LLP

(57) ABSTRACT

Disclosed is a method comprising selecting a mathematical model associated with a nonlinear component, determining an error signal associated with the nonlinear component, wherein the error signal indicates a difference between a first signal and a second signal, estimating one or more parameters that minimize the error signal based on the mathematical model, and estimating and/or linearizing the nonlinear component based on the estimated one or more parameters.

18 Claims, 10 Drawing Sheets

(58) Field of Classification Search
CPC ......... H03F 2200/451; H03F 2200/207; H03F 1/3247; H03F 3/189; H03F 3/24
See application file for complete search history.

(56) References Cited

U.S. PATENT DOCUMENTS

2014/0333376 A1    11/2014  Hammi
2015/0043678 A1*   2/2015   Hammi ..................... H03F 3/24
                                                              375/297

OTHER PUBLICATIONS

Communication pursuant to Article 94(3) EPC dated Jul. 10, 2025 corresponding to European Patent Application No. 20718283.3.
The First Office Action dated Aug. 1, 2025 corresponding to Chinese Patent Application No. 2020801013591, with English translation thereof.

* cited by examiner

PARAMETER ESTIMATION FOR LINEARIZATION OF NONLINEAR COMPONENT

FIELD

The following exemplary embodiments relate to wireless communications, and to digital signal processing for wireless communications.

BACKGROUND

In a wireless communication system, there may be one or more nonlinear components, for example a power amplifier. It is desirable to improve the linearity of nonlinear components in a wireless communication system in order to reduce distortions to transmitted signals, for example.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising means for selecting a mathematical model associated with a nonlinear component, determining an error signal associated with the nonlinear component, wherein the error signal indicates a difference between a first signal and a second signal, estimating one or more parameters that minimize the error signal based on the mathematical model, and estimating and/or linearizing the nonlinear component based on the estimated one or more parameters.

According to another aspect, there is provided an apparatus comprising at least one processor, and at least one memory including computer program code, wherein the at least one memory and the computer program code are configured, with the at least one processor, to cause the apparatus to: select a mathematical model associated with a nonlinear component, determine an error signal associated with the nonlinear component, wherein the error signal indicates a difference between a first signal and a second signal, estimate one or more parameters that minimize the error signal based on the mathematical model, and estimate and/or linearize the nonlinear component based on the estimated one or more parameters.

According to another aspect, there is provided a method comprising selecting a mathematical model associated with a nonlinear component, determining an error signal associated with the nonlinear component, wherein the error signal indicates a difference between a first signal and a second signal, estimating one or more parameters that minimize the error signal based on the mathematical model, and estimating and/or linearizing the nonlinear component based on the estimated one or more parameters.

According to another aspect, there is provided a computer program comprising instructions for causing an apparatus to perform at least the following: select a mathematical model associated with a nonlinear component, determine an error signal associated with the nonlinear component, wherein the error signal indicates a difference between a first signal and a second signal, estimate one or more parameters that minimize the error signal based on the mathematical model, and estimate and/or linearize the nonlinear component based on the estimated one or more parameters.

According to another aspect, there is provided a computer readable medium comprising program instructions for causing an apparatus to perform at least the following: select a mathematical model associated with a nonlinear component, determine an error signal associated with the nonlinear component, wherein the error signal indicates a difference between a first signal and a second signal, estimate one or more parameters that minimize the error signal based on the mathematical model, and estimate and/or linearize the nonlinear component based on the estimated one or more parameters.

According to another aspect, there is provided a non-transitory computer readable medium comprising program instructions for causing an apparatus to perform at least the following: select a mathematical model associated with a nonlinear component, determine an error signal associated with the nonlinear component, wherein the error signal indicates a difference between a first signal and a second signal, estimate one or more parameters that minimize the error signal based on the mathematical model, and estimate and/or linearize the nonlinear component based on the estimated one or more parameters.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
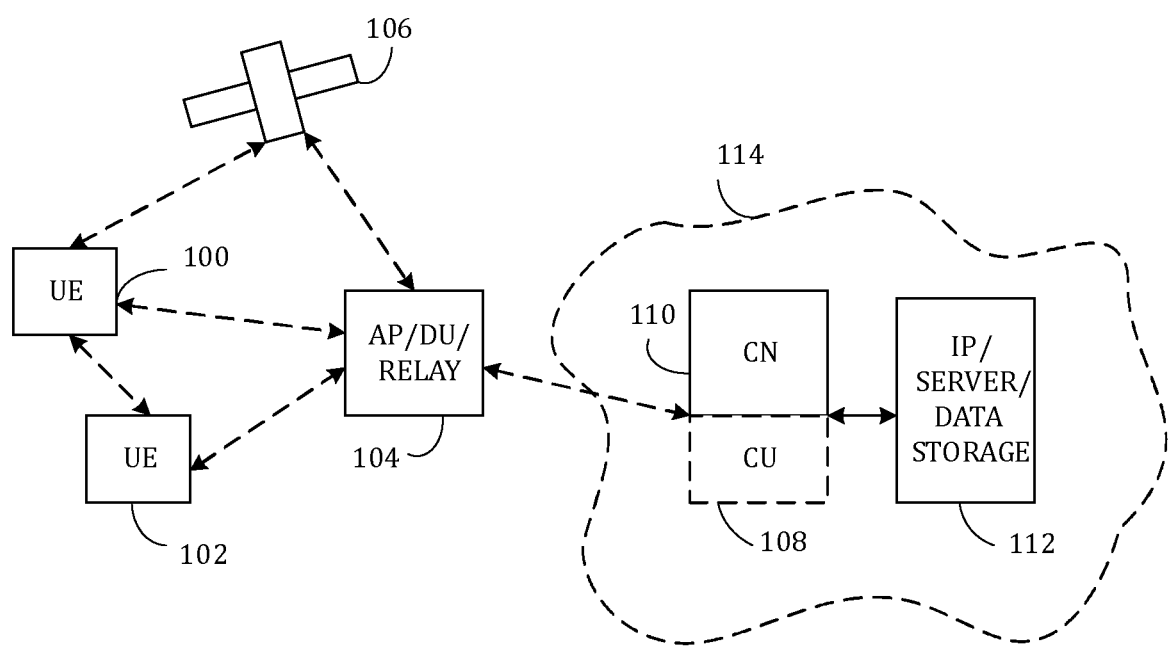
FIG. 1 illustrates an exemplary embodiment of a cellular communication network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which may be large cells that may have a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

A power amplifier, PA, is a component that may be used for increasing the magnitude of power of a given input signal in a wireless communication system. It is desirable to transmit a signal as efficiently as possible in order to reduce power consumption, while also keeping the signal distortion as small as possible. However, these two desirable features may contradict one another, and thus a trade-off between them may be required. The efficiency of a power amplifier may be defined as the percentage of power that the power amplifier uses for amplification in relation to the total direct current power consumed by the power amplifier. High efficiency power amplifiers, which may operate close to their saturation region, may be inherently nonlinear regarding the relationship between the input and output of the power amplifier, and thus distortion may be introduced to the output signal of the power amplifier. However, linearization techniques may be used to improve the linearity of the power amplifier, while still maintaining a reasonable degree of efficiency.

In order to compensate the distortion introduced by the power amplifier, it may be beneficial to characterize the power amplifier's nonlinear behavior and the inverse of that behavior. Power amplifiers may be modeled mathematically based on various parameters to describe, or predict, the nonlinear behavior of the power amplifier. The construction of a mathematical power amplifier model may comprise selecting a model structure and then estimating the model parameters. Some examples of power amplifier model structures may be memoryless nonlinearity models, such as the Saleh model, Rapp model and polynomial model, and nonlinearity models with memory, such as the Volterra series, Wiener model, Hammerstein model and the Wiener-Hammerstein model. Different power amplifier models may have different effects on power amplifier linearization. By identifying an accurate model for a particular power amplifier, linearization performance may be improved.

Various techniques may be used for power amplifier linearization. For example, feedback linearization may be used to feed back a portion of the power amplifier output signal and subtract it from the power amplifier input signal in order to force the output to be a linear replica of the input signal.

Another linearization technique is feedforward linearization, wherein the correction signal may be injected at the power amplifier output instead of at the power amplifier input. Feedforward linearization may use a signal cancellation loop, SCL, coefficient and an error cancellation loop, ECL, coefficient to isolate the distortion created by the power amplifier and subtract it from the output. However, this operation may be susceptible to delay and coefficient mismatches, as well as changes in the characteristics of the power amplifier circuitry caused for example by varying operating conditions and/or aging effects.

On the other hand, adaptive feedforward linearization, for example based on a least-mean-squares, LMS, adaptation algorithm, may be able to adjust the coefficients to minimize the effects of mismatches, as well as to adjust to changes in the operating conditions of the power amplifier, which may result in improved linearization performance.

Digital predistortion, DPD, is another linearization technique that may be used to improve the linearity of power amplifiers. In DPD, a predistorter may be used to predistort the input signal that is fed to the power amplifier, for example to modify the amplitude and/or phase of the input signal, and thus reverse the nonlinearity introduced by the power amplifier, given that an accurate model for the nonlinearity of the power amplifier is used. In DPD, the predistorter may be implemented in the digital baseband domain. Furthermore, adaptive digital predistortion techniques may be used to adjust to changes in the power amplifier model caused for example by aging effects of the power amplifier, and to update the predistorter accordingly. Adaptive digital predistortion may comprise one or more of the following steps: identifying the power amplifier model, estimating the parameters of the identified power amplifier model, and/or estimating the predistortion parameters to be used by the predistorter for inversing the identified power amplifier model.

However, if an adaptation algorithm is developed based on floating-point arithmetic, this may result in a degradation of performance and/or stability if the algorithm is implemented in fixed-point arithmetic for example due to power consumption and/or cost reasons. Such a degradation may be avoided by choosing a high bit width for the implementation, but this may result in high computational complexity.

Another possible limitation of a fixed-point implementation may be the stability and/or performance of the algorithm in case of time variant input signals. There may be a high number of parameters that may be adapted using a signal with certain signal characteristics, for example amplitude and/or phase, in order to linearize a power amplifier. However, a parameter set that is optimized for one signal may cause issues if another signal is used. In addition, the signal characteristics of the signal may change over time.

Figure 2:
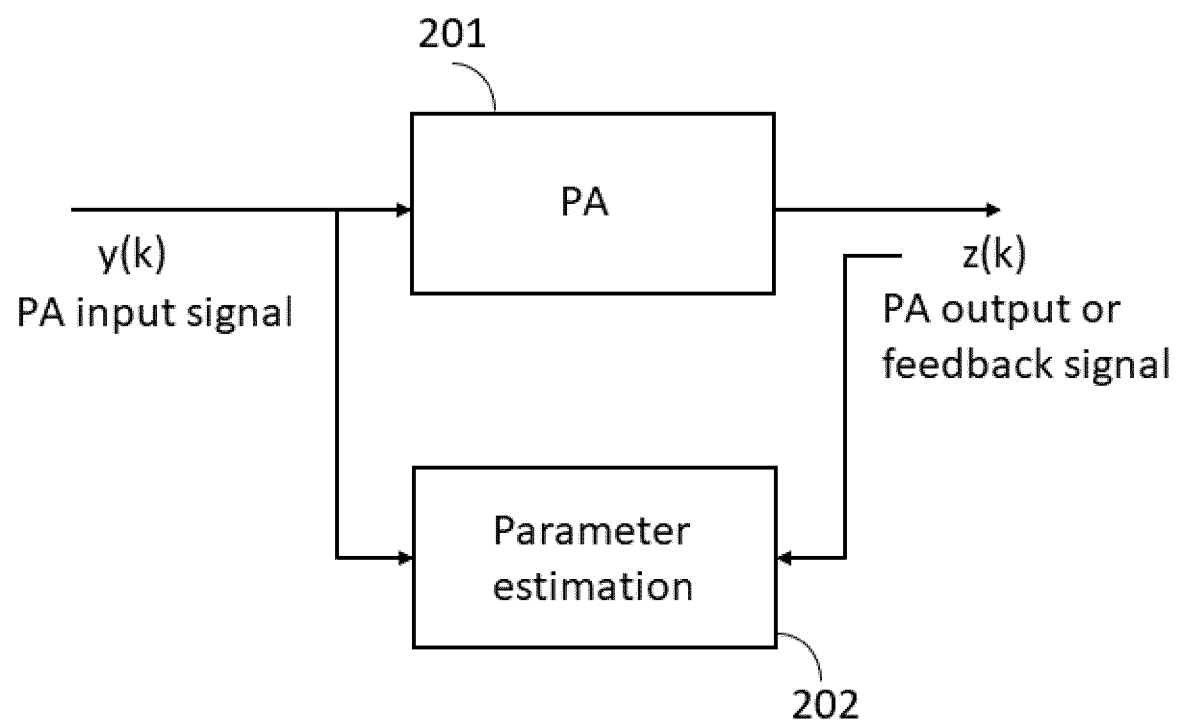
FIG. 2 illustrates parameter estimation for power amplifier model identification according to an exemplary embodiment.

Therefore, it is desirable to improve the convergence, performance, and/or stability of adaptation algorithms, and to provide improved robustness against signal variations, especially for time variant input signals with possibly significant fluctuations of bandwidth and/or power of the transmitted signal. FIG. 2 illustrates parameter estimation for power amplifier model identification according to an exemplary embodiment. A parameter estimation unit 202 may be used to estimate one or more power amplifier model parameters, which may also be referred to as coefficients, that minimize the power of the error $\epsilon(k)$ indicating a difference between a first signal, for example the output signal z(k) of a power amplifier 201, and a second signal, for example the output of a power amplifier model $\hat{p}(y(k))$:

$$\epsilon(k)=\hat{p}(y(k))-z(k)$$

wherein k denotes a sample. The parameter estimation unit may use an LMS algorithm to optimize the one or more parameters. An LMS algorithm is a type of filter that may be used to mimic a desired filter by finding the filter coefficients, or weights, that relate to producing the least mean square of the error signal. The LMS algorithm may approach the optimum filter coefficients by updating the filter coefficients in a manner to converge to the optimum filter coefficient. For example, the algorithm may start by assuming small coefficients, for example zero, and then, at each iteration, update the coefficients by finding the gradient of the mean square error. In the exemplary embodiment, the model of the power amplifier may be a weighted sum of different pre-defined basis functions $p_i(y(k))$:

$$\hat{p}(y(k)) = \sum_i a_i \cdot p_i(y(k))$$

where $a_i$ denotes an estimate of a power amplifier model parameter for the i-th power amplifier model.

In an exemplary embodiment, a least squares solution may be computed as a reference for the LMS algorithm. The least squares solution may comprise an estimate of parameter values that minimize the sum of the squares between the output signal of the power amplifier and the output of the power amplifier model. The LMS algorithm may use an iterative approach for coefficient optimization:

$$a_i(k)=a_i(k-1)-\delta \cdot \epsilon(k) \cdot p_i(y(k))$$

wherein $\delta$ denotes the step size of the LMS algorithm. Floating-point arithmetic may be used in this exemplary embodiment, and thus the LMS algorithm may converge to the result of the least squares solution.

In another exemplary embodiment, fixed-point arithmetic may be used instead of floating-point arithmetic. If fixed-point arithmetic is used, the update of the coefficient $\delta \cdot \epsilon(k) \cdot p_i(y(k))$ may be significantly smaller than the quantization of the fixed-point number would be. Therefore, the adaptation may stop before the minimum of the error would be achieved.

$$a_i(k)=a_i(k-1)-\text{round}(\delta \cdot \epsilon(k) \cdot p_i(y(k)) \cdot 2^{b-1})/2^{b-1}$$

wherein round denotes a mathematical operation that outputs the integer number that is closest to the operand, and b denotes the number of bits used. On the other hand, the number of bits b for the coefficients may be increased in order to achieve the intended performance. However, due to a very small value of the step size $\delta$ and/or an anticipated small error $\epsilon(k)$, the number of bits may become extremely high, for example 48 bits or 64 bits. As all bits for all coefficients may need to be maintained during the adaptation process, this may result in high computational complexity and require a high amount of memory.

In another exemplary embodiment using fixed-point arithmetic, as an alternative to increasing the number of bits, a dither d(k) may be added to the error $\epsilon(k)$:

$$a_i(k)=a_i(k-1)-\text{floor}(\delta\cdot\epsilon(k)\cdot p_i(y(k))\cdot 2^{b-1}+d(k))/2^{b-1}$$

wherein floor is a mathematical operation that outputs the integer number that is less than or equal to the operand. Dither may be defined as an intentionally applied form of noise that may be used for example to randomize quantization error. The dither may comprise a value that is determined based at least partly on a least significant bit, LSB. The dither may be for example a random number based on a probability distribution with a value range between 0 and the LSB, said LSB being for example 1. For example, the dither may be an equally distributed random number, which may also be referred to as a uniformly distributed random number, between 0 and the LSB. However, it should be noted that other probability distributions may also be used instead of uniform distribution. With a certain higher probability according to $\delta\cdot\epsilon(k)\cdot p_i(y(k))$, the coefficient may converge to the desired result even in case of fixed-point arithmetic with a low number of bits b, for example 16 bits.

Another limiting factor of fixed-point arithmetic may be the maximum magnitude of a coefficient. Particularly, if two basis functions $p_i(y(k))$ are similar to each other, they may compensate each other, which may lead to coefficients with high magnitude. For stabilization against an unrestricted growth of the coefficients, a small fraction of the coefficients may be subtracted in every iteration for example if floating-point arithmetic is used. However, due to the relatively high numerical value of an LSB, fixed-point arithmetic resolution may make it difficult to subtract a small fraction of the coefficients.

To address the above limitation, in another exemplary embodiment using fixed-point arithmetic and dither, the probability of change towards a lower magnitude of the coefficients may be increased, and therefore the stabilization against an unrestricted growth of the coefficients may be achieved:

$$a_i(k)=\text{floor}((a_i(k-1)-\delta\cdot\epsilon(k)\cdot p_i(y(k))-\gamma\cdot a_i(k-1))\cdot 2^{b-1}+d(k))/2^{b-1}$$

where $\gamma$ denotes a forgetting factor for leaky LMS. However, this modification of the LMS algorithm may lead to a systematic degradation of the minimization of the power of the error $\epsilon(k)$. In other words, the leaky LMS algorithm may try to minimize the power of the coefficients, but this may cause the linearization results to be degraded. Moreover, in the case of time variant signals, the coefficients may be modified so that small coefficients, which may be sufficient for the actual input signal, may be chosen. However, due to this choice, this coefficient set may cause high deviations for other input signals. Therefore, in case of a time variant input signal, there may be periods of time during which a high error may occur until new coefficients are adapted.

To address the above issue, in another exemplary embodiment using fixed-point arithmetic and dither, one or more reference coefficients may be used as a target for convergence instead of zero coefficients. The one or more reference coefficients may be adapted for example based on an input signal with a higher power and/or a wider bandwidth than the current input signal, or based on a time variant input signal with varying amplitude and/or frequency hopping. When these one or more reference coefficients are adapted for example based on an input signal with high power and/or wide bandwidth, or a time variant input signal with varying amplitude and/or frequency hopping, the one or more reference coefficients may enable that the model coefficients that are adapted for other signal scenarios are similar to each other in magnitude, and therefore the degradation and the time for the next adaptation may be reduced. Using the one or more reference coefficients with LMS may prevent adjacent channel leakage ratio, ACLR, degradation due to non-optimal coefficients in time variant signal scenarios.

$$a_i(k)=\text{floor}((a_i(k-1)-\delta\cdot\epsilon(k)\cdot p_i(y(k))-\gamma\cdot(a_i(k-1)-a_{i,ref}(k-1)))\cdot 2^{b-1}+d(k))/2^{b-1}$$

where $a_{i,ref}$ denotes a reference coefficient for the i-th power amplifier model.

Figure 3:
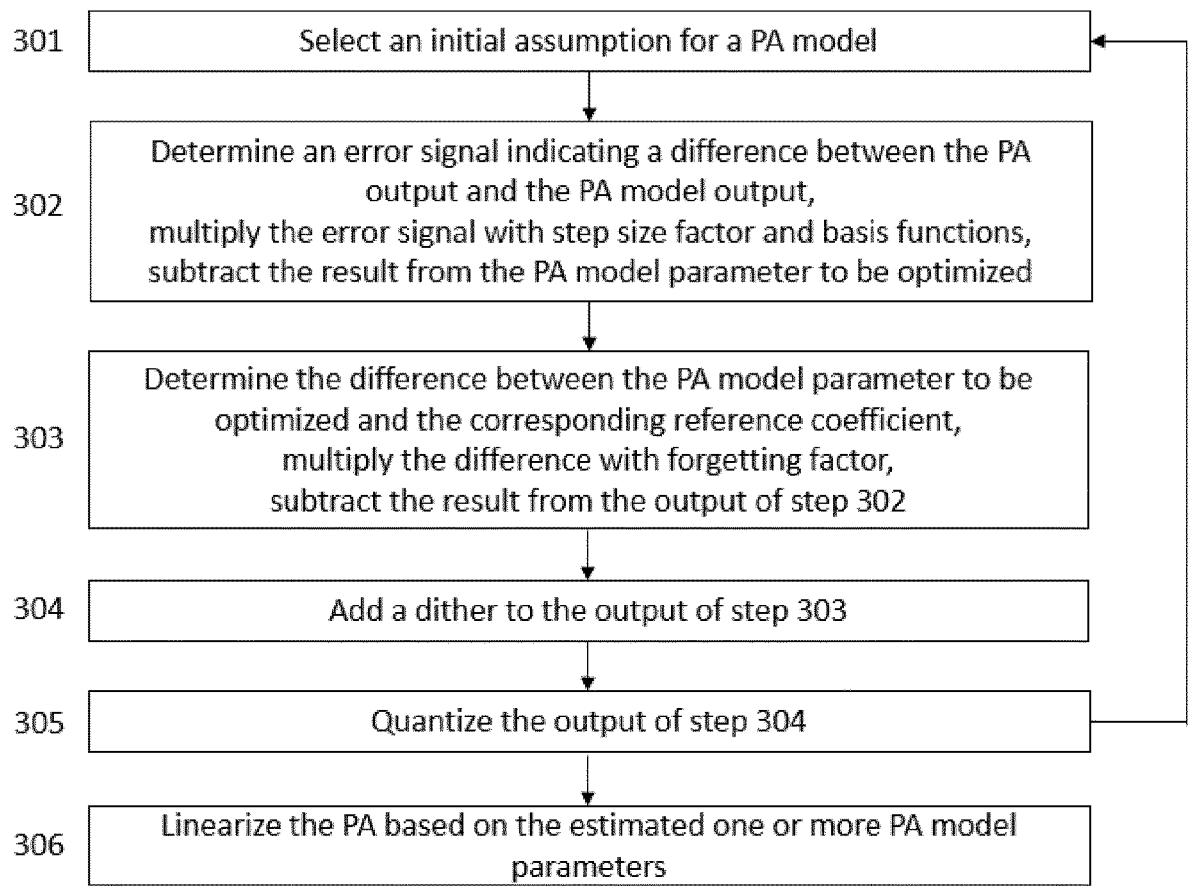
FIG. 3 illustrates a flow chart for power amplifier model identification according to an exemplary embodiment.

FIG. 3 illustrates a flow chart for power amplifier model identification according to an exemplary embodiment. In step 301, an initial assumption for a power amplifier model associated with a power amplifier is selected. In step 302, an error signal is determined, wherein the error signal indicates a difference between a first signal, for example an output from the power amplifier, and a second signal, for example an output from the power amplifier model. The error signal is then multiplied by a step size factor and one or more pre-defined basis functions. The result of the multiplication is subtracted from the power amplifier model parameter to be optimized. In step 303, the difference between the power amplifier model parameter to be optimized and the corresponding reference coefficient is determined. The difference is then multiplied by a forgetting factor, and the result of the multiplication is subtracted from the output of step 302. In step 304, a dither is added to the output of step 303, said dither having a value between 0 and an LSB. In step 305, the output of step 304 is quantized. The process may be iterative, so that after step 305 the process may return to step 301. In other words, steps 301 to 305 may be performed multiple times in order to iteratively improve the estimation of the one or more power amplifier model parameters that minimize the error signal. In step 306, the power amplifier may be linearized based on the estimated one or more power amplifier model parameters comprised in the output of step 305. For example, the input or output signal of the power amplifier may be compensated by an inverse of the nonlinear behaviour described by the power amplifier model comprising the estimated one or more power amplifier model parameters.

Figure 4:
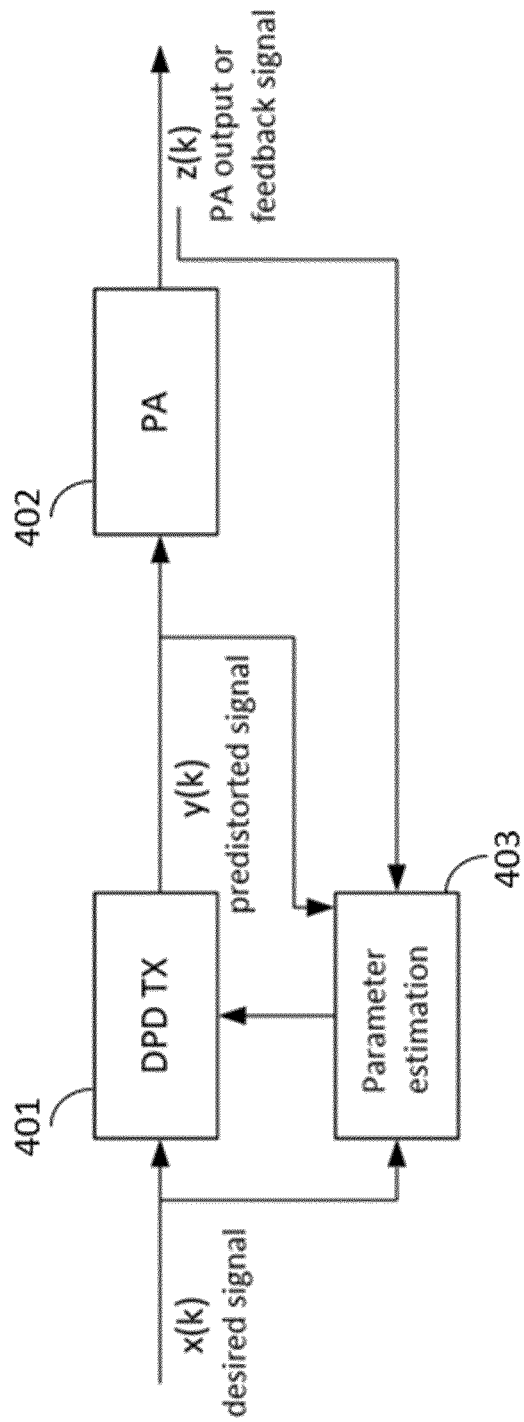
FIG. 4 illustrates digital predistortion parameter estimation according to an exemplary embodiment.

Various exemplary embodiments may not be limited to power amplifier model identification. Some exemplary embodiments may be used for example for DPD. FIG. 4 illustrates parameter estimation for digital predistortion according to an exemplary embodiment. In FIG. 4, a predistorter 401 may be used to provide a predistorted signal to a power amplifier 402 in order to linearize the power amplifier. A parameter estimation unit 403 may be used to estimate the predistortion parameters that minimize the error signal indicating a difference between a first signal, for example the desired signal x(k) to be amplified, and a second signal, for example the power amplifier output z(k). The difference indicated by the error signal may be for example any distortion other than linear amplification. The estimated predistortion parameters may then be used by the predistorter for predistorting the desired signal before feeding it to the power amplifier in order to inverse the nonlinear behavior of the power amplifier, and thus the power amplifier may be linearized. The predistortion parameters may also be referred to as DPD coefficients herein. The error signal to be minimized regarding for example its average power may be described as:

$$\epsilon(k)=z(k)-x(k)$$

The output signal of the power amplifier, which may indicate the impact of the power amplifier on its input signal y(k), may be described by:

$$z(k) = p(y(k))$$

Optimization of the predistortion parameters may be performed by targeting a minimum power of the error signal:

$$|\epsilon(k)|^2 = \min$$

The chain rule for derivatives may be applied:

$$\frac{\partial |\epsilon(k)|^2}{\partial e_i} = \frac{\partial |\epsilon(k)|^2}{\partial \epsilon(k)} \frac{\partial \epsilon(k)}{\partial e_i}$$

$$= \frac{\partial |\epsilon(k)|^2}{\partial \epsilon(k)} \frac{\partial \epsilon(k)}{\partial z(k)} \frac{\partial z(k)}{\partial e_i}$$

$$= \frac{\partial |\epsilon(k)|^2}{\partial \epsilon(k)} \frac{\partial \epsilon(k)}{\partial z(k)} \frac{\partial p(y(k))}{\partial e_i}$$

$$= \frac{\partial |\epsilon(k)|^2}{\partial \epsilon(k)} \frac{\partial \epsilon(k)}{\partial z(k)} \frac{\partial p(y(k))}{\partial y(k)} \frac{\partial y(k)}{\partial e_i}$$

$$= 2\epsilon^*(k) \frac{\partial p(y(k))}{\partial y(k)} \frac{\partial y(k)}{\partial e_i}$$

In the exemplary embodiment, the model of the power amplifier may be a weighted sum of different pre-defined basis functions $b_i(x(k))$:

$$y(k) = \sum_i e_i \cdot b_i(x(k))$$

where $e_i$ denotes an estimate of a DPD coefficient according to the i-th basis function. This may result in:

$$\frac{\partial |\epsilon(k)|^2}{\partial e_i} = 2\epsilon^*(k) \frac{\partial p(y(k))}{\partial y(k)} b_i(x(k))$$

Furthermore, the DPD coefficients may be updated according to the LMS algorithm:

$$e_i(k) = e_i(k-1) - \delta \cdot \epsilon^*(k) \frac{\partial p(y(k))}{\partial y(k)} b_i(x(k))$$

The characteristics of the power amplifier p(y(k)) may not be known, and therefore an approximation may need to be done. A direct learning architecture, DLA, may use a simple power amplifier model:

$$p_{DLA}(y(k)) = y(k)$$

DLA is a technique that may be used to identify the DPD coefficients. By using the DLA algorithm, the DPD coefficients may be updated according to the following formula:

$$e_{i,DLA}(k) = e_{i,DLA}(k-1) - \delta \cdot \epsilon^*(k) \cdot b_i(x(k))$$

In another exemplary embodiment, a more complex approach for power amplifier modelling may be introduced, which may increase the convergence range of the DPD significantly. The power amplifier may be modelled by a linear filter, for example:

$$p_{lin}(y(k)) = \sum_l p_l y(k-l)$$

In this case, a gradient descent algorithm may be used, wherein the gradient may use a sum of different time-delayed versions of one basis function:

$$\frac{\partial |\epsilon(k)|^2}{\partial e_i} = \frac{\partial |\epsilon(k)|^2}{\partial \epsilon(k)} \frac{\partial \epsilon(k)}{\partial z(k)} \frac{\partial p(y(k))}{\partial e_i}$$

$$= \frac{\partial |\epsilon(k)|^2}{\partial \epsilon(k)} \frac{\partial \epsilon(k)}{\partial z(k)} \sum_l \frac{\partial p_l y(k-l)}{\partial y(k-l)} \frac{\partial y(k-l)}{\partial e_i}$$

$$= 2\epsilon^*(k) \sum_l p_l \frac{\partial y(k-l)}{\partial e_i}$$

$$= 2\epsilon^*(k) \sum_l p_l b_i(x(k-l))$$

which may lead to modified coefficient update equations:

$$e_{i,lin}(k) = e_{i,lin}(k-1) - \delta \cdot \epsilon^*(k) \cdot \sum_l p_l b_i(x(k-l))$$

The above formula may be implemented for example in floating-point arithmetic.

If fixed-point arithmetic is used instead of floating-point arithmetic, the updated term may be smaller than one LSB, and therefore the minimum of the cost function may not be reached. However, in another exemplary embodiment, by using the dither technique described previously for power amplifier model identification, convergence for fixed-point arithmetic may be maintained:

$$e_{i,lin}(k) =$$

$$\mathrm{floor}\left(\left(\begin{array}{c} e_{i,lin}(k-1) - \delta \cdot \epsilon^*(k) \cdot \sum_l p_l b_i(x(k-l)) - \\ \gamma \cdot (e_{i,lin}(k-1) - e_{i,linref}(k-1)) \end{array}\right) \cdot 2^{b-1} + d(k)\right)/2^{b-1}$$

In some cases, the filtering of the basis function according to the linear characteristics of the power amplifier may be numerically expensive. It may be used so that the gradient process calculates implicitly a sum of many points in time, so that those elements which are using the same basis function with the same time index may be combined. In this case, filtering of the error signal may be necessary.

In another exemplary embodiment, filtering of the error signal, which may be referred to herein as matched filtering, may be performed:

$$e_{i,lin}(k) = \mathrm{floor}\left(\left(e_{i,lin}(k-1) - \delta \cdot \sum_l (p_l \cdot \epsilon^*(k+l)) \cdot b_i(x(k)) - \gamma \cdot (e_{i,lin}(k-1) - e_{i,linref}(k-1))\right) \cdot 2^{b-1} + d(k)\right)/2^{b-1}$$

The linear characteristics of a power amplifier model may represent the behavior of the power amplifier for the frequency range for which the predistortion should be done. However, in some cases only narrow band signals may be transmitted, which may provide limited information. Moreover, the nonlinear behavior of the power amplifier may lead to incorrect estimates, if the DPD input and output signal are considered as such.

In another exemplary embodiment, pulse insertion and/or wideband estimation of a linear model may be performed.

An improved wideband measurement may be achieved if the input signal is modified to be wideband. However, the requirements for wireless transmission may need to be maintained, and therefore only short periods, or pulses, of wideband signals may be added to the signal. A plurality of those pulses may be collected over a longer period of time in order to obtain the desired wideband information. It may be beneficial for those pulses to not exceed the magnitude of the signal, if they are in a certain range of magnitudes. Such a pulse may be generated if a multiple of one sample of the signal is subtracted from itself, and if the factor would be less than or equal to two.

Dither in combination with coefficient stabilization based on one or more reference coefficients may be used in any combination with the gradient descent algorithm and/or LMS algorithm, and may be applicable for artificial neural network structures as well. In artificial neural network structures applying machine learning, backward error propagation may be utilized by an exemplary embodiment applying the chain rule of the gradient descent algorithm, such as described above for DPD. Backward error propagation may also be referred to as backpropagation.

Figure 5:
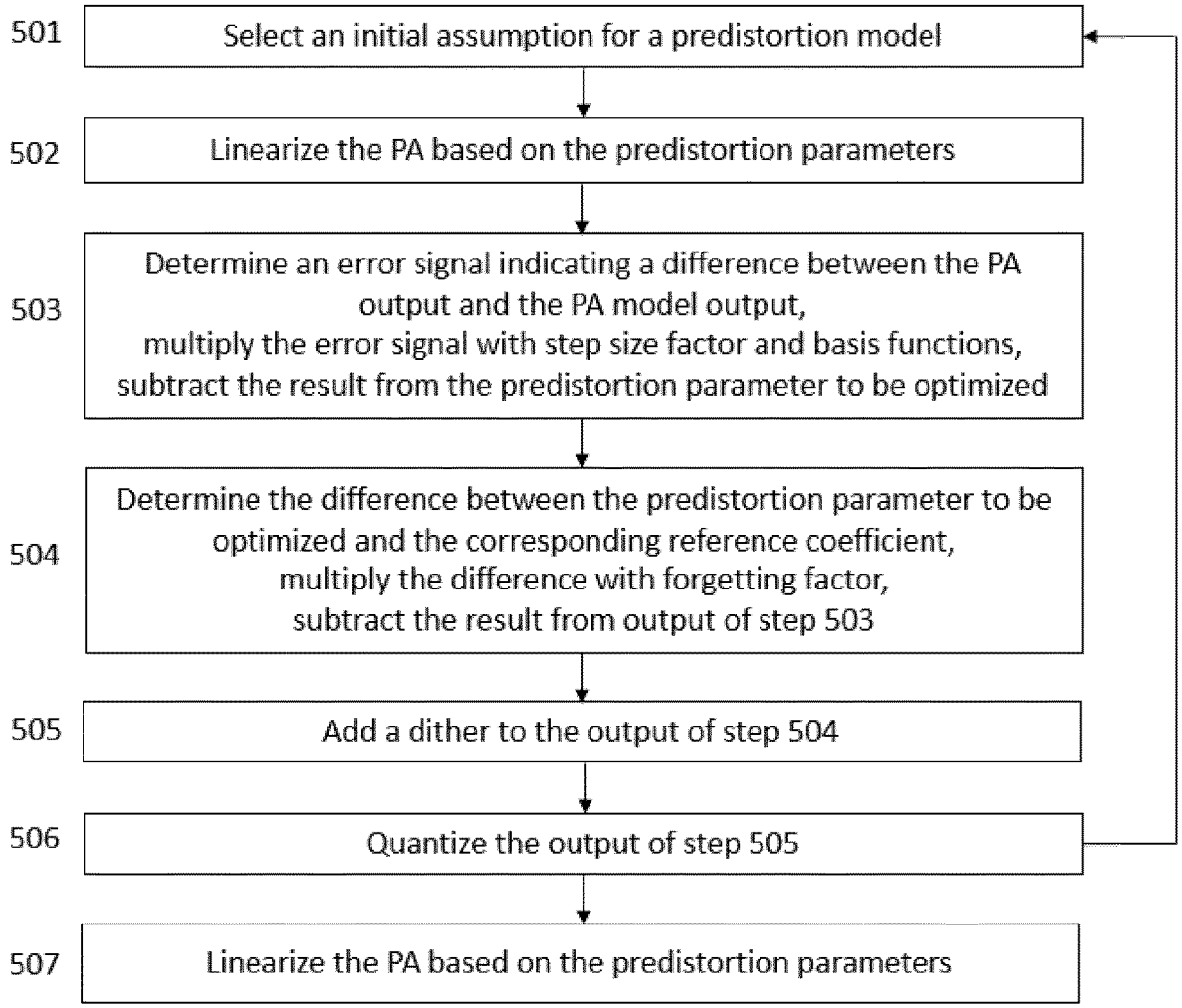
FIG. 5 illustrates a flow chart for digital predistortion parameter estimation according to an exemplary embodiment.

FIG. 5 illustrates a flow chart for DPD parameter estimation according to an exemplary embodiment. In step 501, an initial assumption for a predistortion model associated with a power amplifier is selected. In step 502, the power amplifier is linearized based on the one or more predistortion parameters according to the initial predistortion model. In step 503, an error signal is determined, wherein the error signal indicates a difference between a first signal, for example an output from the power amplifier, and a second signal, for example an output from the power amplifier model. The error signal is then multiplied by a step size factor and one or more basis functions. The result of the multiplication is subtracted from the predistortion parameter to be optimized. In step 504, the difference between the predistortion parameter to be optimized and the corresponding reference coefficient is determined. The difference is then multiplied by a forgetting factor, and the result of the multiplication is subtracted from the output of step 503. In step 505, a dither is added to the output of step 504, said dither having a value between 0 and an LSB. In step 506, the output of step 505 is quantized. The process may be iterative, so that after step 506 the process may return to step 501. In other words, steps 501 to 506 may be performed multiple times in order to iteratively improve the estimation of the one or more predistortion parameters that minimize the error signal. In step 507, the power amplifier may be linearized by providing a predistorted signal to the power amplifier based on the estimated one or more predistortion parameters comprised in the output of step 506.

Figure 6:
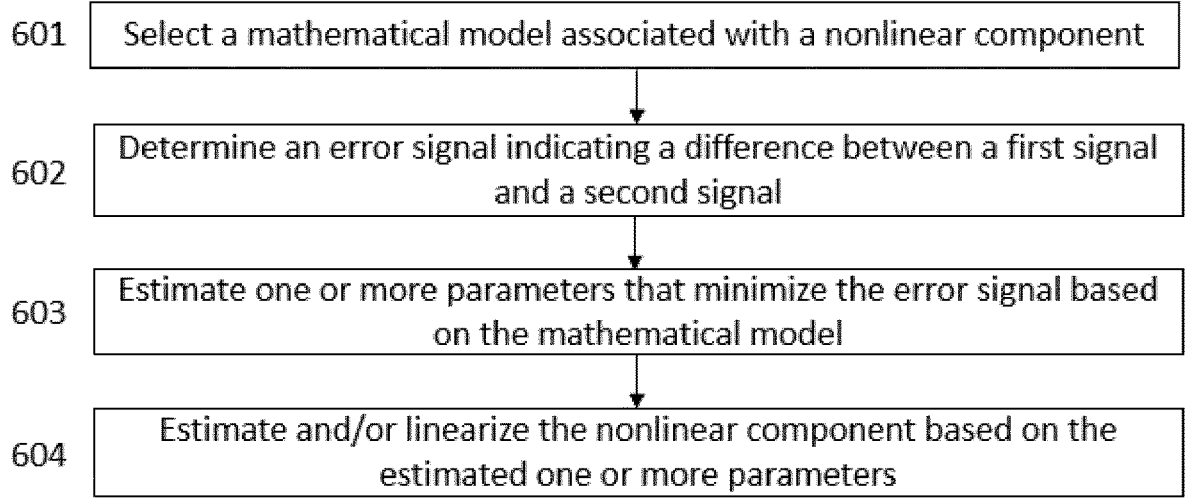
FIG. 6 illustrates a flow chart according to an exemplary embodiment.

FIG. 6 illustrates a flow chart according to an exemplary embodiment. In step 601, a mathematical model associated with a nonlinear component is selected. In step 602, an error signal associated with the nonlinear component is determined, wherein the error signal indicates a difference between a first signal and a second signal. In step 603, one or more parameters that minimize the error signal based on the mathematical model are estimated. In step 604, the nonlinear component is estimated and/or linearized based on the estimated one or more parameters.

In an exemplary embodiment, one or more parameters that minimize the average power of the error signal based on the mathematical model are estimated.

Furthermore, in some exemplary embodiments the mathematical model associated with the nonlinear component may be an inverse model of the nonlinear component.

The functions and/or steps described above by means of FIGS. 2-6 are in no absolute chronological order, and some of them may be performed simultaneously or in an order differing from the described one. Other functions may also be executed between them or within them.

Figure 7:
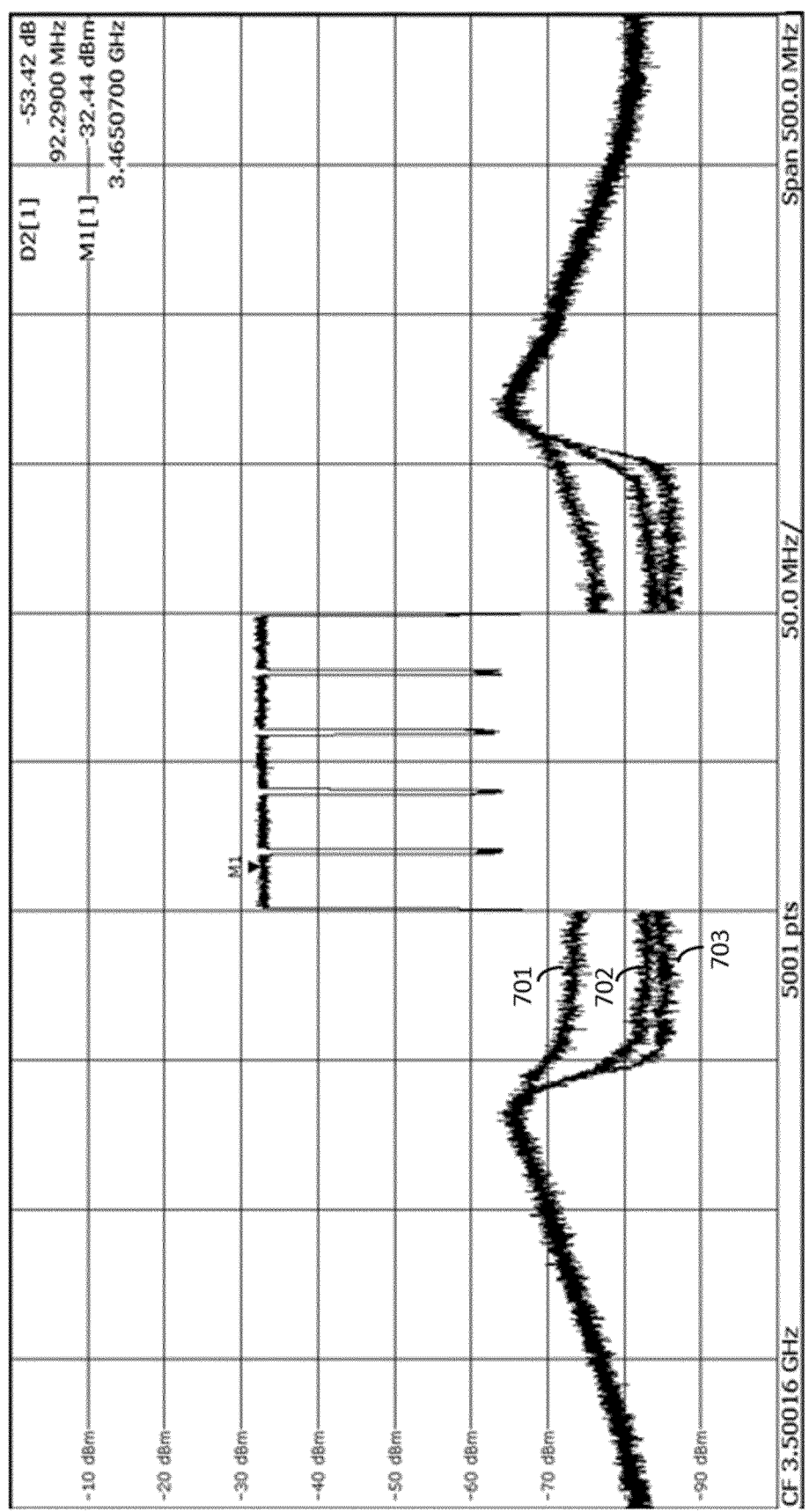
FIG. 7, FIG. 8 and FIG. 9 illustrate measurement results according to exemplary embodiments.

FIG. 7 illustrates measurement results for gradient dither according to an exemplary embodiment. The measurement setup according to the exemplary embodiment may comprise a Gallium Nitride, GaN, front end module, FEM, with 36 dBm output power, a linearization bandwidth of 250 MHz, and a carrier configuration of 5 LTE 20 MHz carriers. For signal 701, the step size $\delta=2^{-9}$ and dither is off. For signal 702, $\delta=2^{-7}$ and dither is off. For signal 703, $\delta=2^{-10}$ and dither is on.

Figure 8:
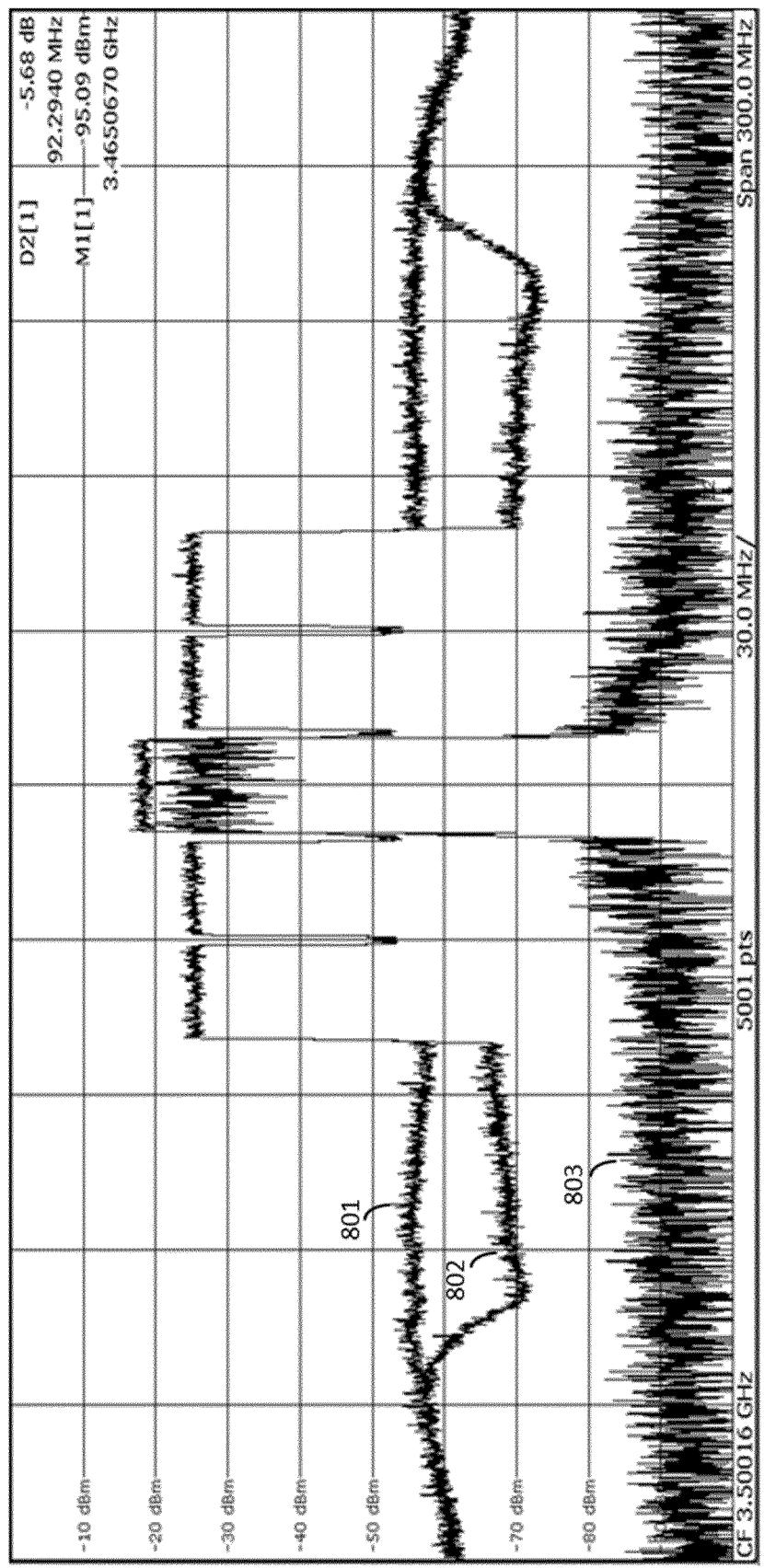

FIG. 8 illustrates measurement results for spectrum according to an exemplary embodiment. The time variant measurement setup may comprise the following switching scenario:

5 LTE 20 MHz on for 0.04 seconds
1 LTE 20 MHZ on for 10 seconds

For signal 801, there are no reference coefficients look-up tables, and there is max hold. For signal 802, there are reference coefficients look-up tables, and there is max hold. Signal 803 indicates current measurements.

Figure 9:
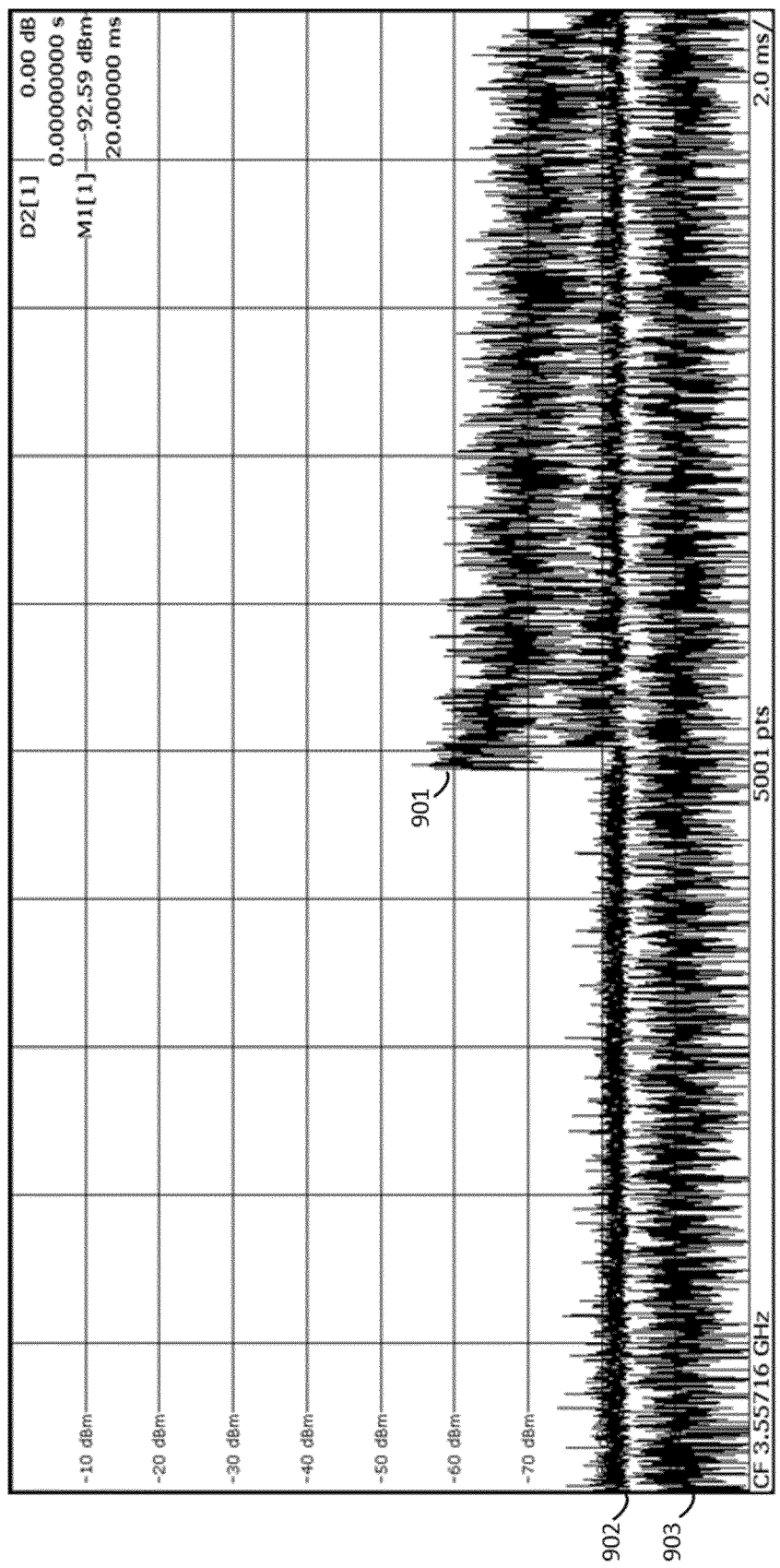

FIG. 9 illustrates measurement results for behavior over time with zero span according to an exemplary embodiment. The time variant measurement setup may comprise the following switching scenario:

5 LTE 20 MHz on for 0.04 seconds
1 LTE 20 MHZ on for 10 seconds

For signal 901, there may be no reference coefficients look-up tables. Signal 902 may be a signal with reference coefficients look-up tables. Signal 903 may indicate current measurements.

Some exemplary embodiments may be applied to MIMO systems and/or single transmitter, TX, systems. A technical advantage provided by some exemplary embodiments may be that they may improve performance and/or stability of a wireless communication system. Some exemplary embodiments may provide faster reactions to sudden variations in the operating conditions of the wireless communication system, and/or provide improved robustness against signal variations. Some exemplary embodiments may reduce distortions caused for example by time variant signals. Furthermore, some exemplary embodiments may enable using a lower number of bits for coefficient adaptation based on fixed-point arithmetic, thus simplifying the hardware and/or software implementation. Additionally, some exemplary embodiments may reduce the time for convergence of the DPD, which may be beneficial especially for MIMO implementations.

Figure 10:
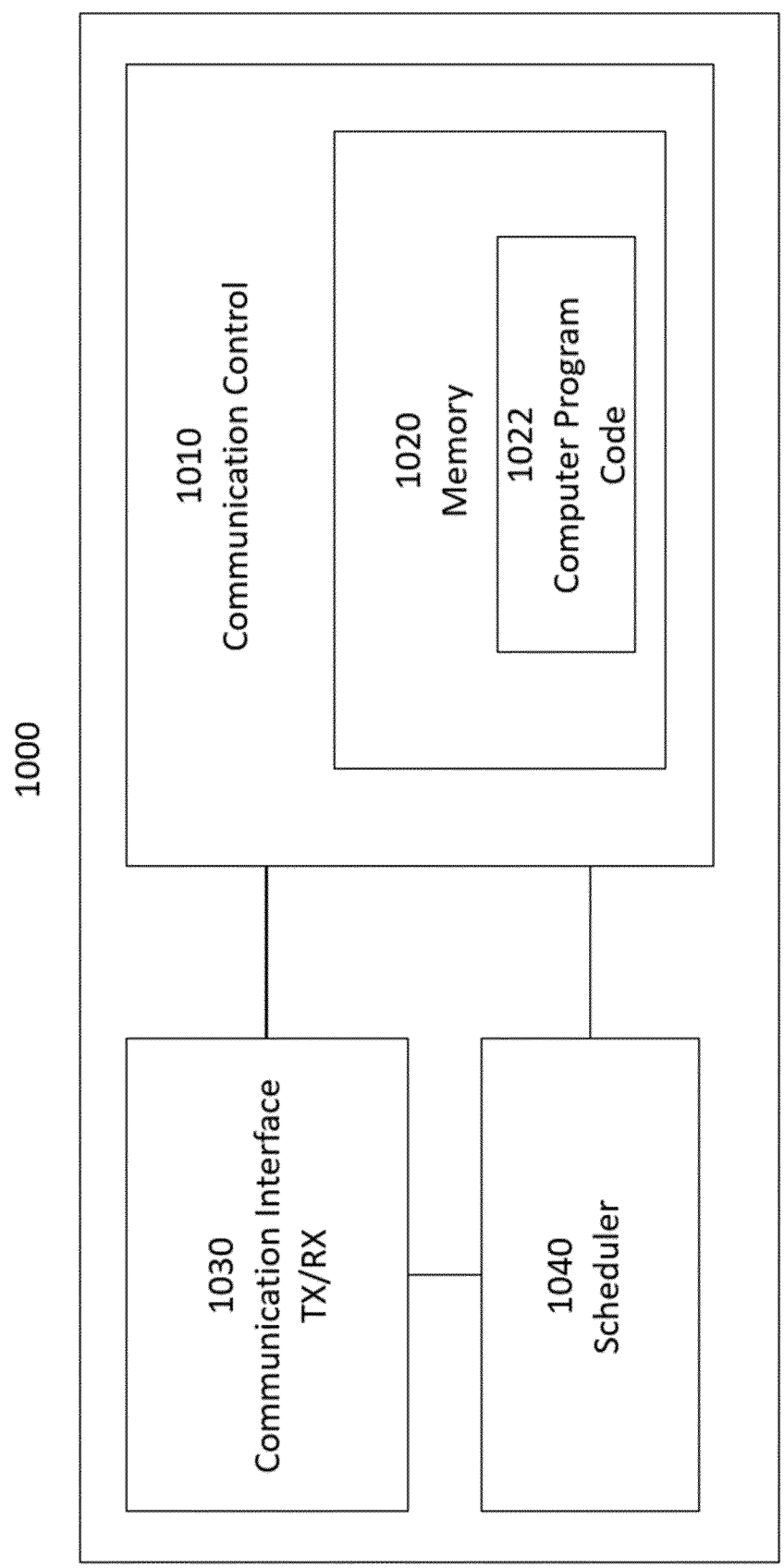
FIG. 10 illustrates an apparatus according to an exemplary embodiment.

The apparatus 1000 of FIG. 10 illustrates an exemplary embodiment of an apparatus that may comprise or be comprised in a computing device, for example a system-on-chip, SoC, device or a digital front end, DFE, device. The apparatus 1000 may comprise, for example, a circuitry or a chipset applicable for realizing the exemplary embodiments described above. The apparatus 1000 may be an electronic device comprising one or more electronic circuitries. The apparatus 1000 may comprise a communication control circuitry 1010 such as at least one processor, for example a digital signal processor, and at least one memory 1020 including a computer program code (software) 1022 wherein the at least one memory and the computer program code (software) 1022 are configured, with the at least one processor, to cause the apparatus 1000 to carry out any one of the exemplary embodiments of the apparatus 1000 described above.

The memory 1020 may be implemented using any suitable data storage technology, such as semiconductor-based memory devices, flash memory, magnetic memory devices and systems, optical memory devices and systems, fixed memory and removable memory. The memory may comprise a configuration database for storing configuration data. The memory 1020 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1020 stores computer readable instructions that are executed by the at least one processor. For example, non-volatile memory stores the computer readable instructions and the at least one processor executes the instructions using volatile memory for temporary storage of data and/or instructions.

The apparatus 1000 may further comprise one or more communication interfaces 1030 (transmitter/receiver, TX/RX) comprising hardware and/or software for realizing communication connectivity according to one or more communication protocols. The communication interface 1030 may provide the apparatus with radio communication capabilities to communicate in a wireless communication system. The communication interface may, for example, provide a radio interface with one or more access nodes, one or more terminal devices (possibly via said plurality of access nodes) and/or one or more other network nodes or elements. The communication interface may further comprise components such as a power amplifier, linearizer, filter, frequency converter, analog-to-digital converter, digital-to-analog converter, (de)modulator, antenna, and/or encoder/decoder circuitries, controlled by the corresponding controlling units. The apparatus 1000 may further comprise a scheduler 1040 that is configured to allocate resources.

As used in this application, the term "circuitry" may refer to one or more or all of the following:
  a. hardware-only circuit implementations (such as implementations in only analog and/or digital circuitry) and
  b. combinations of hardware circuits and software, such as (as applicable):
    i. a combination of analog and/or digital hardware circuit(s) with software/firmware and
    ii. any portions of hardware processor(s) with software (including digital signal processor(s)), software, and memory(ies) that work together to cause an apparatus, such as a mobile phone, to perform various functions) and
  c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
at least one processor; and
at least one memory including computer program code, wherein the at least one memory and the computer program code are configured, with the at least one processor, to cause the apparatus to:
select a mathematical model associated with a nonlinear component;
determine an error signal associated with the nonlinear component, wherein the error signal indicates a difference between a first signal and a second signal;
estimate one or more parameters that minimize the error signal based on the mathematical model, wherein a dither and fixed-point arithmetic are used for estimating the one or more parameters;
estimate and/or linearize the nonlinear component based on the estimated one or more parameters.

2. The apparatus according to claim 1, wherein the dither comprises a value that is determined based at least partly on a least significant bit.

3. The apparatus according to claim 1, wherein one or more reference coefficients are used for estimating the one or more parameters, said one or more reference coefficients being configured based on an input signal with a higher power and/or a wider bandwidth than a current input signal, or based on a time variant input signal with a varying amplitude and/or frequency hopping.

4. The apparatus according to claim 1, wherein a gradient descent algorithm is used for estimating the one or more parameters.

5. The apparatus according to claim 1, wherein a least-mean-squares algorithm is used for estimating the one or more parameters.

6. The apparatus according to claim 1, wherein an artificial neural network is used for estimating the one or more parameters.

7. The apparatus according to claim 6, wherein the artificial neural network utilizes backward error propagation for estimating the one or more parameters.

8. The apparatus according to claim 1, wherein the nonlinear component is a power amplifier and the mathematical model is a power amplifier model.

9. The apparatus according to claim 8, wherein the first signal is an output from the power amplifier and the second signal is an output from the power amplifier model.

10. The apparatus according to claim 1, wherein a linear model is used for the mathematical model associated with the nonlinear component.

11. The apparatus according to claim 10, further comprising performing pulse insertion and/or wideband estimation of the linear model.

12. The apparatus according to claim 1, further comprising performing matched filtering of the error signal.

13. A method, comprising:
    selecting a mathematical model associated with a nonlinear component;
    determining an error signal associated with the nonlinear component, wherein the error signal indicates a difference between a first signal and a second signal;
    estimating one or more parameters that minimize the error signal based on the mathematical model, wherein a dither and fixed-point arithmetic are used for estimating the one or more parameters;
    estimating and/or linearizing the nonlinear component based on the estimated one or more parameters.

14. The method according to claim 13, wherein the dither comprises a value that is determined based at least partly on a least significant bit.

15. The method according to claim 13, wherein one or more reference coefficients are used for estimating the one or more parameters, said one or more reference coefficients being configured based on an input signal with a higher power and/or a wider bandwidth than a current input signal, or based on a time variant input signal with a varying amplitude and/or frequency hopping.

16. The method according to claim 13, wherein a gradient descent algorithm is used for estimating the one or more parameters.

17. The method according to claim 13, wherein a least-mean-squares algorithm is used for estimating the one or more parameters.

18. A non-transitory computer-readable medium comprising instructions encoded thereon that, when executed on an apparatus, cause the apparatus to:
    select a mathematical model associated with a nonlinear component;
    determine an error signal associated with the nonlinear component, wherein the error signal indicates a difference between a first signal and a second signal;
    estimate one or more parameters that minimize the error signal based on the mathematical model, wherein a dither and fixed-point arithmetic are used for estimating the one or more parameters; and
    estimate and/or linearize the nonlinear component based on the estimated one or more parameters.

* * * * *